United States Patent [19]

Fujisawa

[11] Patent Number: 5,016,180

[45] Date of Patent: May 14, 1991

[54] TAMPER PROOF METHOD AND APPARATUS FOR ADJUSTING A CONTROL PARAMETER OF A CONTROLLED APPARATUS

[75] Inventor: Masaaki Fujisawa, Katsuta, Japan

[73] Assignee: Hitachi, Ltd., Tokyo, Japan

[21] Appl. No.: 391,704

[22] Filed: Aug. 4, 1989

Related U.S. Application Data

[63] Continuation of Ser. No. 103,292, Oct. 1, 1987, abandoned.

[30] Foreign Application Priority Data

Oct. 1, 1986 [JP] Japan ............................... 61-231183

[51] Int. Cl.[5] ........................ G06F 15/20; F02P 17/00; F02D 28/00

[52] U.S. Cl. ........................... 364/431.04; 364/431.05; 123/339; 123/417

[58] Field of Search ...................... 364/424.01, 431.03, 364/431.04, 431.05, 431.07; 123/339, 416, 417

[56] References Cited

U.S. PATENT DOCUMENTS

| | | | |
|---|---|---|---|
| 4,355,360 | 10/1982 | Asano et al. | 364/431.03 |
| 4,366,541 | 12/1982 | Mouri et al. | 364/571.04 |
| 4,432,331 | 2/1984 | Yasuhara | 364/431.03 |
| 4,470,390 | 9/1984 | Omori et al. | 364/431.04 |
| 4,547,852 | 10/1985 | Kamifuji et al. | 364/431.04 |
| 4,586,403 | 5/1986 | Lee et al. | 364/571.01 |
| 4,594,667 | 6/1986 | Yasuhara | 364/431.04 |
| 4,672,566 | 6/1987 | Asano et al. | 364/571.04 |
| 4,677,558 | 6/1987 | Böhmler et al. | 364/431.04 |

*Primary Examiner*—Parshotam S. Lall
*Assistant Examiner*—Brian M. Mattson
*Attorney, Agent, or Firm*—Antonelli, Terry, Stout & Kraus

[57] ABSTRACT

A method and apparatus for controlling a control parameter of a controlled device, such as the idle speed of an internal combustion engine, permits the setting of the control parameter in a tamper-proof manner. A control unit receives an adjustment value in the form of a compensation signal from an adjusting device, such as a potentiometer, during an adjustment mode and calculates a control value to control the parameter of the controlled device. When adjustment of the control parameter is complete, a normal mode is entered in which the calculated control value is stored in a non-volatile memory for use in controlling the controlled device, and the control unit ignores further signals received from the adjusting device.

11 Claims, 2 Drawing Sheets

TAMPER PROOF METHOD AND APPARATUS FOR ADJUSTING A CONTROL PARAMETER OF A CONTROLLED APPARATUS

This application is a continuation of application Ser. No. 103,292, filed Oct. 1, 1987, now abandoned.

BACKGROUND OF THE INVENTION

The present invention relates to an engine control system for internal combustion engines, or more in particular, to an engine control system having the functions of fine adjustment of control values including idle engine speed and mixture ratio.

Conventional engine control systems have a mechanism for fine adjustment of such values as a control target. An example of adjustment of idle engine speed is disclosed, for example, in "Automotive Engineering" No. 7, 1986, p. 83 to p. 84.

In the aforementioned prior art system, the idle set engine speed is finely adjusted in such a manner that a constant voltage is applied across a variable resistor provided for an engine control system, and the neutral potential thereof is read by an A/D converter thereby to change the set engine speed in accordance with the potential.

In this conventional system, however, the fact that the set value is easy to change by operation of the variable resistor adversely affects the tamperproofness, and that, a movable part provided therein poses the problem of a deviation of the set value due to vibration or damage to the movable part by improper operation.

SUMMARY OF THE INVENTION

Accordingly, the object of the present invention is to provide a tamper-proof, highly reliable engine control system which has no movable part for fine adjustment.

According to the present invention, there is provided an engine control system, wherein a movable adjustment unit which has been mounted with the conventional control system is provided separately from a control unit and is adapted for electrical connection therewith, which control unit includes a memory for storing a compensation value for operation in connection with the adjustment unit.

DESCRIPTION OF THE PREFERRED EMBODIMENTS

Figure 2:
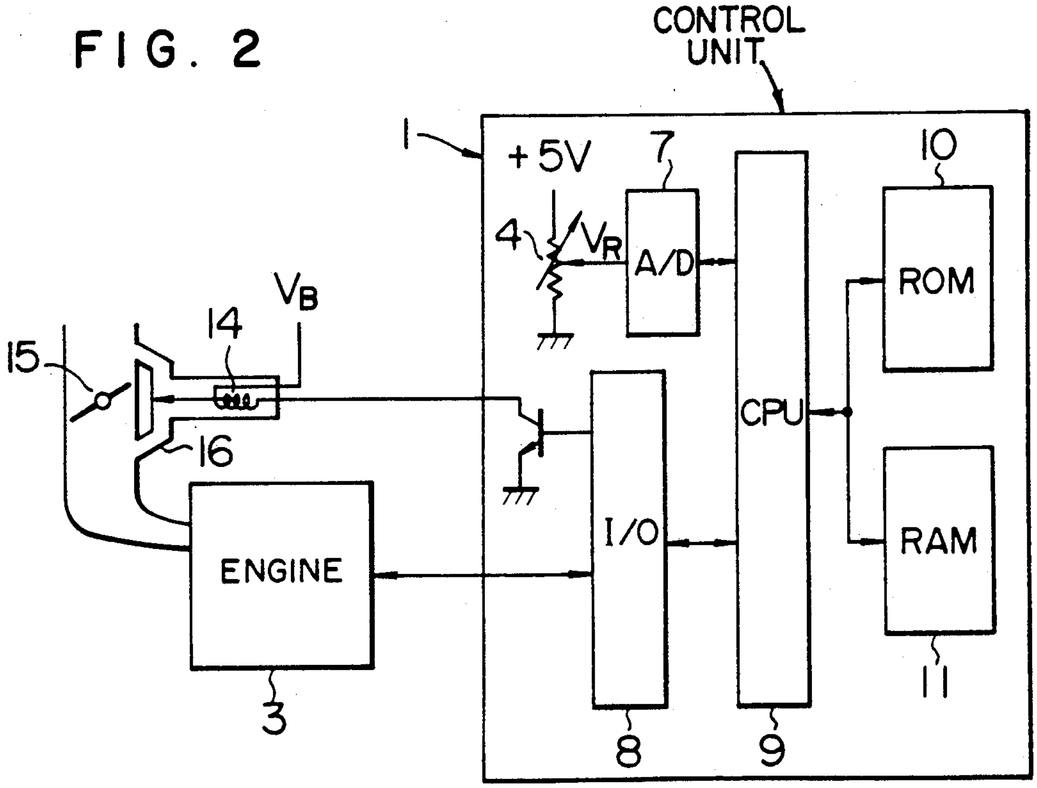
FIG. 2 shows a configuration of a conventional control system.

An embodiment of the present invention will be described below. FIG. 2 is a diagram showing a conventional system of idle engine speed control, in which the opening of an air path 16 bypassing a throttle valve 15 is controlled by a proportional solenoid valve 14 driven by a duty factor signal. In this case, the idle engine speed is set to a preprogrammed target value, such as 700 rpm, by feedback control through a control unit 1 of an engine 3. The method of this control, which will not be described in detail herein, is well known. This target value is set initially at a central value which is considered optimum. Nevertheless, it may be desired to make some fine adjustment depending on engine quality variations or secular variations.

Figure 3:
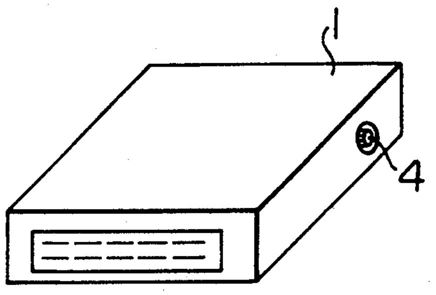
FIG. 3 shows an actual appearance of the prior art.
Figure 4:
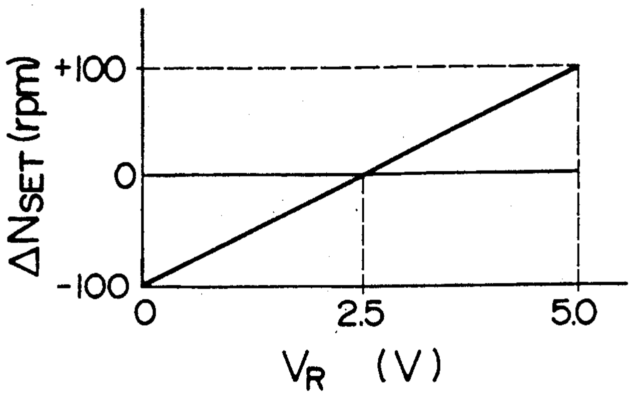
FIG. 4 is a diagram showing a compensation value of a target idle engine speed.

For this purpose, according to the prior art, a fine adjustment mechanism 4 such as shown in FIG. 2 is added to the control unit 1. The fine adjustment mechanism 4 is a potentiometer of the rotary type, and is adapted to be rotated by a screw driver from the side of a case of the control system 1 in the manner shown in FIG. 3. The control unit 1 reads the neutral voltage $V_R$ of the potentiometer 4 through an A/D converter 7, and according to the value thus read, searches a table having characteristics shown in FIG. 4 to determine a compensation value $\Delta N_{SET}$ of the target engine speed. This compensation value is added to a central value $N_{SET\phi}$ of target engine speed set in advance thereby, thus calculating the final target engine speed $N_{SET}$.

Specifically, $$N_{SET}=N_{SET\phi}+\Delta N_{SET}$$

where $$\Delta N_{SET}=f(V_R)$$

Then, in a manner to attain the target engine speed $N_{SET}$, feedback control is effected. The control unit 1 includes a CPU 9 for a computation operation, a memory (ROM 10, RAM 11) for storing a program and control constants, and an I/O circuit 8 for input and output control, as is well known.

In this system having a fine adjustment mechanism 4 which is easy to operate, as mentioned above, the tamper-proofness is adversely affected. Also, the fact that the control system 1 has a movable adjustment mechanism results in the disadvantage that the setting is liable to deviate under vibrations, or the system is subject to damage by faulty operation. According to the present invention, these disadvantages are obviated by a configuration shown in FIG. 1.

Figure 1:
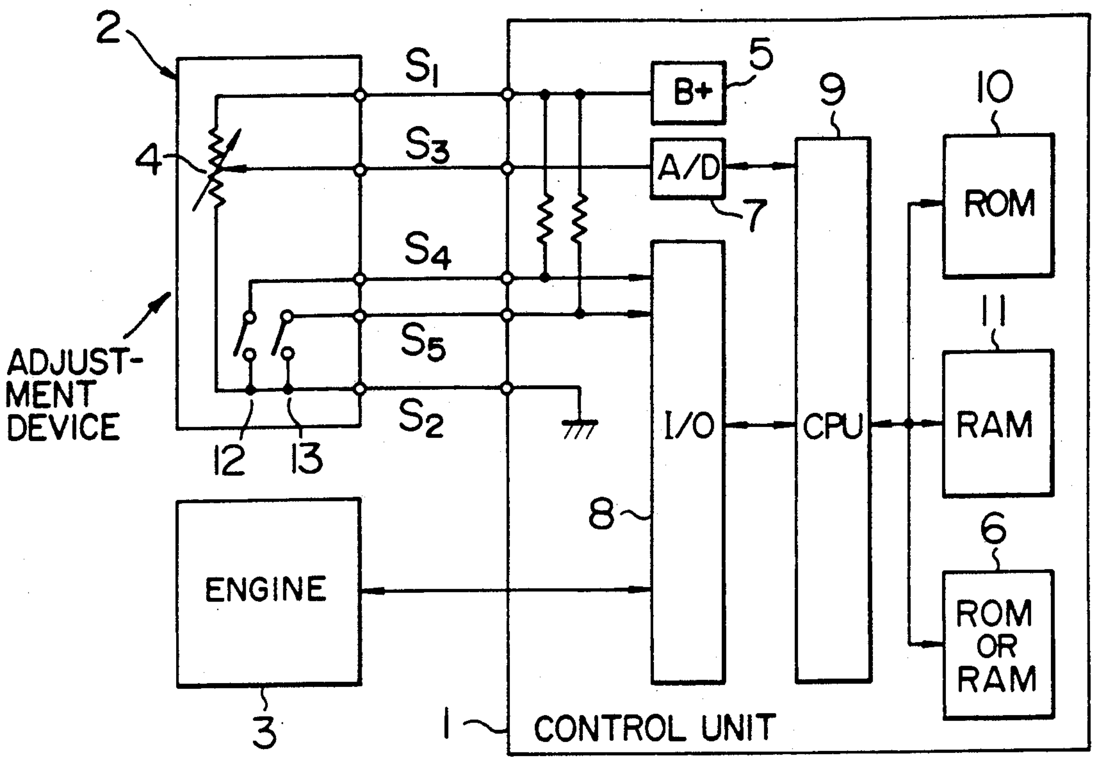
FIG. 1 is a diagram showing a configuration of an embodiment of the present invention.

The potentiometer 4 shown in FIG. 1 is mounted on an adjustment unit 2 separate from the control system 1. The adjustment unit 2 also has a circuit 12 for producing a mode switch signal and a circuit 13 for producing a compensation amount memory command signal. According to the embodiment under consideration, these circuits are all realized by an on/off switch. The adjustment unit 2 is adapted for electrical connection to the control unit 1 through a connector. In the embodiment under consideration, such a connection is established by five signal wires including a power wire S1 for the potentiometer 4, an earth wire S2, a neutral voltage signal wire (compensation signal wire) S3 for the potentiometer 4, a mode switch signal wire S4 and a compensation amount command signal wire S5. Now, the signals of the wires S1, S2, S3, S4 and S5 are designated as S1', S2', S3', S4' and S5' respectively hereafter.

On the control unit 1 side, the power wire S1 is supplied with a constant voltage of +5 V from a constant voltage source 5, the wire S2 is connected to the earth of the control unit 1, the wire S3 is connected to the A/D converter 7, and the wires S4 and S5 are pulled up to the power of +5V of the constant-voltage source through a resistor on one hand and are connected to the I/0 8 on the other hand. As a result, voltage levels of the wires S4 and S5 are read as "low" (hereinafter referred to as "L") when switches 12, 13 are on and as "high" (hereinafter referred to as "H") when the switches 12, 13 are off.

The S4' is read as "H" when the adjustment unit 2 is not connected to the control unit 1 or when the switches 12, 13 are off even if the adjustment unit 2 is connected to the unit 1. In this case, the control unit 1 operates in a normal mode, and the input signals of the wires S3 and S5 have no meaning (are ignored).

When the adjustment unit 2 is connected to the control unit 1 and the switch 12 is turned on with the S4' being read as "L", on the other hand, the control unit 1 shifts to the adjustment mode, thereby making the signals on the wires S3 and S5 valid. In the adjustment mode, the signal S3 is read through the A/D converter, and then the following calculation is made in a manner similar to the prior art:

$$N_{SET}=N_{SET\phi}+\Delta N_{SET}$$

Figure 5:
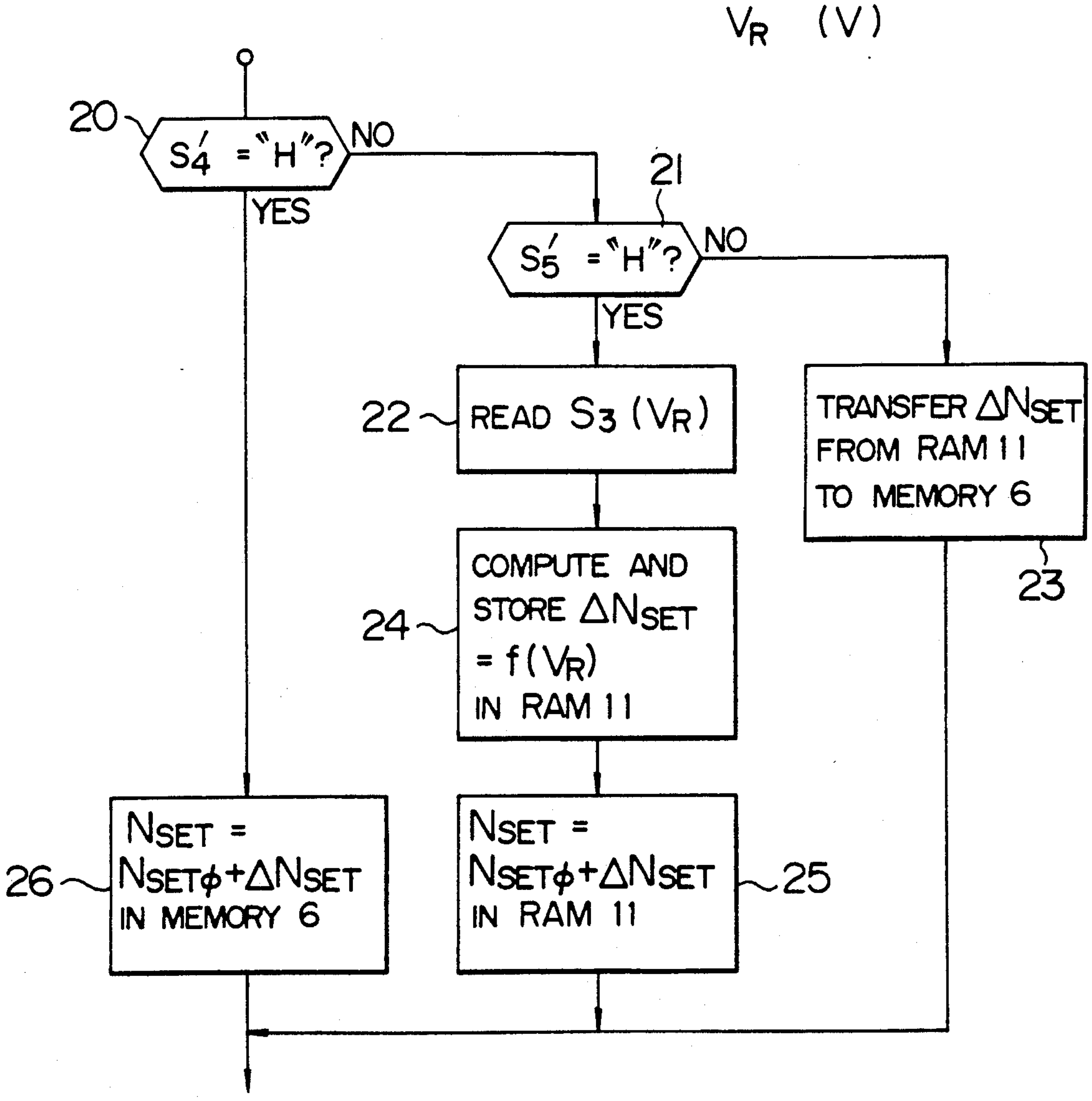
FIG. 5 is a flowchart showing the operation of an embodiment of the present invention.

In the process, the switch 13 is off (that is, S5'="H"), and as long as the signal S5' is "H", the value $\Delta N_{SET}$ is updated successively with the change in the S3' signal, and the resulting value is stored temporarily in RAM 11. The engine speed is monitored by operating the potentiometer 4, and when the desired engine speed is reached, the switch 13 is turned on to reduce the signal S5' to "L". Then, the control unit 1 writes the value $\Delta N_{SET}$ stored in the RAM 11 into a non-volatile memory 6 such as EEPROM or RAM backed up with a battery. In this embodiment, the circuit is configured in such a way that when the S5' is "L" the wire S3 becomes invalid, and therefore, if the value of $\Delta N_{SET}$ written in the memory 6 is to be rewritten, the condition of S5'="H" is required to be restored (with the switch 13 off) to repeat the aforementioned process. Once the desired value of $\Delta N_{SET}$ is written in the memory 6 in this way, the switch 12 is turned off and further the adjustment unit 2 is disconnected from the connector, thus cutting the connection between the control unit 1 and the adjustment unit 2, whereby the signal S4' is made "H" for operation in the normal mode. In the normal mode, the control unit 1 reads out the value of $\Delta N_{SET}$ written in the memory 6, and by use of this value, computes the value $N_{SET}=N_{SET\phi}+\Delta N_{SET}$, so that control is effected with the resulting $N_{SET}$ as a target engine speed. A flowchart of the aforementioned operation is shown in FIG. 5.

Step 20 decides whether the mode switch signal S4' is "H" or "L", and if it is "L", the adjustment mode is decided. The next step 21 decides whether the compensation amount memory command signal S5' is "H" or "L", and if it is "H", the compensation value $\Delta N_{SET}$ is changed. Step 22 reads the neutral voltage $V_R$ of the potentiometer 4, followed by step 24 where a binary data of $\Delta N_{SET}$ proportional to the neutral voltage is stored in the RAM 11. The next step 25 adds the target engine speed central value $N_{SET\phi}$ and the compensation value $N_{SET}$ so that the final target engine speed $N_{SET}$ is determined to decide whether the desired target engine speed has been reached or not. If the desired engine speed is not yet reached, the neutral point potential is changed by the potentiometer 4, followed by repeating the operation of the steps 22, 24 and 25.

When the desired engine speed is reached, by contrast, in step 21, the switch 13 is turned on which reduces the signal S5' to "L", followed by step 23 where the value $\Delta N_{SET}$ is shifted from the RAM 11 to the memory in the form of a RAM or an EEPROM backed up.

In the case where the signal S4' is "H" at step 20, a normal control mode prevails, and step 26 determines the final target engine speed $N_{SET}$ from the value $\Delta N_{SET}$ stored in the memory 6 and the value $N_{SET\phi}$ stored in the ROM 10.

An embodiment of the present invention has been explained above as an adjustment of a target value of idle engine speed. It is evident, however, that a similar configuration is applicable also to various controls such as compensation of the air-fuel ratio.

Unlike the embodiment described above, a control output (such as a duty factor of the an ISC valve drive signal), but not a control target value, may be adjusted, in which case the feedback control is suspended, but the output is fixed to a predetermined value in adjustment mode.

Further, instead of using an independent digital or analog signal as S3', S4' or S5' as in the present embodiment, a common signal wire may be used by serial communication.

Furthermore, in the normal control mode, it is also possible to correct the value written in the memory 6 in the adjustment mode sequentially for compensation of secular variations, etc. by what is called the learning programming.

According to the present invention, the adjustment is impossible without an exclusive adjustment unit, and therefore, the tamper-proofness is not adversely affected, while at the same time improving the reliability with movable parts being eliminated.

I claim:

1. An adjustment device for controlling an operation parameter of an apparatus, comprising:

manually settable compensation amount determining means for producing a compensation amount signal representing an amount of compensation of a control value used in controlling said operation parameter;

mode decision means for selectively producing a mode signal indicating an adjustment mode or a normal mode; and control means connected to said manually settable compensation amount determining means and said mode decision means for producing a control output signal for controlling said operation parameter based on a control value corrected by a compensation value, including memory means for storing a compensation value, and processing means for:

(a) storing in said memory means a compensation value based on said compensation amount signal and producing said control output signal based on said compensation value when said mode signal indicates an adjustment mode, and (b) producing said control output signal based on a compensation value previously stored in said memory means and without regard to said compensation amount signal when said mode signal indicates a normal mode.

2. The adjustment device according to claim 1, wherein said manually settable compensation amount determining means comprises a potentiometer.

3. The adjustment device according to claim 1, wherein said mode decision means comprises a manually operable switch connected to a signal source.

4. An adjustment device for controlling an operation parameter of an apparatus, comprising:

manually settable compensation amount determining means for producing a compensation amount signal representing an amount of compensation of a control value used in controlling said operation parameter;

mode decision means for selectively producing a mode signal indicating an adjustment mode or a normal mode; and control means connected to said manually settable compensation amount determining means and said mode decision means for producing a control output signal for controlling said operation parameter based on a control value corrected by a compensation value, including memory means for storing a compensation value, and processing means for:

(a) storing in said memory means a compensation value based on said compensation amount signal and producing said control output signal based on said compensation value when said mode signal indicates an adjustment mode, and (b) producing said control output signal based on a compensation value previously stored in said memory means and without regard to said compensation amount signal when said mode signal indicates a normal mode;

wherein said memory means includes a first memory and a second memory, and further including memory command means for generating a command signal to indicate to said processing means that a predetermined condition of said apparatus has been reached, said processing means being responsive to said mode signal indicating said adjustment mode for storing said compensation value based on said compensation amount signal in said first memory and for shifting said compensation value from said first memory to said second memory upon receipt of said command signal, and said processing means being responsive to said mode signal indicating said normal mode for producing said control output signal based on a compensation value stored in said second memory.

5. An adjustment apparatus for an engine control system, comprising:

first memory means for storing a control program and fixed control values;

second memory means, of a type in which data can be rewritten and stored in a non-volatile manner, for storing compensation values;

third memory means for temporarily storing compensation values;

control means connected to said first, second and third memory means for generating a control output signal to perform a predetermined engine control processing according to (i) the control program and a fixed control value stored in said first memory means and (ii) a compensation value stored in said second memory means, including:

(a) mode decision means for producing a mode signal indicating an adjustment mode for correcting a compensation value;

(b) compensation amount determining means for producing a compensation amount signal representing an amount of compensation for a control value;

(c) memory command means for generating a command signal to indicate that a predetermined engine condition is reached; and (d) processing means connected to said mode decision means and said compensation amount determining means for storing in aid third memory means a compensation value based on a a compensation amount signal received from said compensation amount determining means when said mode signal indicating an adjustment mode is received from said mode decision means and for transferring a compensation value from said third memory means to said second memory means when said command signal is received from said memory command means while said mode signal indicates an adjustment mode.

6. The adjustment apparatus according to claim 5, wherein said compensation amount determining means comprises a manually adjustable potentiometer.

7. The adjustment apparatus according to claim 5, wherein said mode decision means comprises a manually operable switch connected to a signal source.

8. The adjustment apparatus according to claim 5, wherein said memory command means comprises a manually operable switch connected to a signal source.

9. A method of controlling adjustment of an operation parameter of an apparatus, comprising the steps of:

(a) continuously producing a compensation amount signal representing an amount of compensation of a control value used in controlling said operation parameter by means of a manually adjustable device;

(b) calculating a compensation value from said compensation amount signal during an adjustment mode period of time;

(c) storing said compensation value in a memory device; and (d) during a normal mode of operation following said adjustment mode period of time, generating a control signal for controlling said operation parameter based on a compensation value stored in said memory device and without regard to said compensation amount signal.

10. A tamper-proof adjustment device for controlling an operation parameter of an apparatus, comprising:

a detachable control amount determining unit including manually settable means for producing a control amount signal representing an amount of a control value used in controlling said operation parameter; and control means selectively connectable to said control amount determining unit for producing a control output signal for controlling said operation parameter based on a stored control value, including means for determining a control value from a control amount signal received when said control amount determining unit is attached to said control means, means for storing the control value determined by said determining means and means for producing said control output signal based on the control value stored in said storing means when said control amount determining unit is detached from said control means.

11. A tamper-proof adjustment apparatus for an engine control system for controlling an operation parameter thereof, comprising:

a manually settable and detachable compensation amount determining unit including means for producing a compensation amount signal representing an amount of compensation of a control value used in controlling said operation parameter; and control means connectable to said manually settable and detachable compensation amount determining unit for producing a control output signal for controlling said operation parameter based on a control value corrected by a compensation value, including memory means, of a type in which data can be re-written and stored in a non-volatile manner, for storing a compensation value determined from a compensation amount signal received from said manually settable and detachable compensation amount determining unit and processing means for:

(a) storing in said memory means a compensation value based on said compensation amount signal and controlling said control means to produce said control output signal based on said compensation value when said manually settable and detachable compensation amount determining unit is attached to said control means; and (b) producing said control output signal based on a compensation value previously stored in said memory means when said manually settable and detachable compensation amount determining unit is detached from said control means.

* * * * *